(12) United States Patent
Jones

(10) Patent No.: US 12,106,562 B2
(45) Date of Patent: Oct. 1, 2024

(54) SYSTEM AND METHOD FOR ANOMALY DETECTION OF A SCENE

(71) Applicant: Mitsubishi Electric Research Laboratories, Inc., Cambridge, MA (US)

(72) Inventor: Michael Jones, Belmont, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 433 days.

(21) Appl. No.: 17/497,104

(22) Filed: Oct. 8, 2021

(65) Prior Publication Data

US 2023/0111754 A1  Apr. 13, 2023

(51) Int. Cl.
| | | |
|---|---|---|
| *G06V 20/40* | (2022.01) | |
| *G05B 23/02* | (2006.01) | |
| *G06F 18/20* | (2023.01) | |
| *G06F 18/214* | (2023.01) | |
| *G06F 18/22* | (2023.01) | |
| *G06T 7/00* | (2017.01) | |

(Continued)

(52) U.S. Cl.
CPC ......... *G06V 20/41* (2022.01); *G05B 23/0286* (2013.01); *G06F 18/2148* (2023.01); *G06F 18/22* (2023.01); *G06F 18/285* (2023.01); *G06T 7/001* (2013.01); *G06T 7/11* (2017.01); *G06T 7/248* (2017.01); *G06V 10/50* (2022.01); *G06V 20/49* (2022.01); *G06T 2207/10016* (2013.01); *G06T 2207/20081* (2013.01); *G06T 2207/30164* (2013.01)

(58) Field of Classification Search
CPC ........ G06V 20/41; G06V 10/50; G06V 20/49; G06V 2201/06; G06V 10/758; G06V 20/46; G06V 20/52; G05B 23/0286; G06F 18/2148; G06F 18/22; G06F 18/285; G06T 7/001; G06T 7/11; G06T 7/248; G06T 2207/10016; G06T 2207/20081; G06T 2207/30164; G06T 7/0008; G06T 7/254; G06T 2207/20021
See application file for complete search history.

(56) References Cited

PUBLICATIONS

Colque, R.V.H.M., 2018. Robust approaches for anomaly detection applied to video surveillanc.*

(Continued)

*Primary Examiner* — Zhitong Chen
(74) *Attorney, Agent, or Firm* — Gene Vinokur; Hironori Tsukamoto

(57) ABSTRACT

A system for detecting an anomaly in a video of a factory automation scene is disclosed. The system may accept the video; accept a set of training feature vectors derived from spatio-temporal regions of a training video, where a spatio-temporal region is associated with one or multiple training feature vectors; partition the video into multiple sequences of video volumes; produce a sequence of binary difference images for each of the video volumes; count occurrences of each of predetermined patterns of pixels in each binary difference image for each of the video volumes to produce an input feature vector including an input motion feature vector defining a temporal variation of counts of the predetermined patterns for each of the video volumes; produce a set of distances based on the produced input feature vectors and the set of training feature vectors; and detect the anomaly based on the produced set of distances.

20 Claims, 11 Drawing Sheets

(51) Int. Cl.
    *G06T 7/11*         (2017.01)
    *G06T 7/246*      (2017.01)
    *G06V 10/50*     (2022.01)

(56) References Cited

PUBLICATIONS

Szkilnyk, G., Hughes, K., Fernando, H. and Surgenor, B., Nov. 2012. Spatiotemporal volume video event detection for fault monitoring in assembly automation. In 2012 19th International Conference on Mechatronics and Machine Vision in Practice (M2VIP) (pp. 20-25). IEEE.*

Imran, J. and Raman, B., 2019. Deep residual infrared action recognition by integrating local and global spatio-temporal cues. Infrared Physics & Technology, 102, p. 103014.*

Li, N., Chang, F. and Liu, C., 2020. Spatial-temporal cascade autoencoder for video anomaly detection in crowded scenes. IEEE Transactions on Multimedia, 23, pp. 203-215.*

Saligrama, V. and Chen, Z., Jun. 2012. Video anomaly detection based on local statistical aggregates. In 2012 IEEE Conference on computer vision and pattern recognition (pp. 2112-2119). IEEE.*

* cited by examiner

SYSTEM AND METHOD FOR ANOMALY DETECTION OF A SCENE

TECHNICAL FIELD

The present disclosure relates generally to image processing, and more particularly to video anomaly detection of a scene.

BACKGROUND

Recently, automation in workplaces is used in various applications to reduce cost of processes (such as a manufacturing process) to develop end product(s). For instance, factory automation may be a factory assembly line, where the factory assembly line includes robots, conveyors, and other machines that can automatically pick raw materials and assemble the raw materials into more complex devices and products. In some cases, the factory assembly line may have problems (e.g. faults) that require human intervention to fix. If the faults aren't identified on time, then the faults may lead to bigger problems and ultimately lead to long downtimes.

Currently, there are various techniques that aim to detect the faults on time. These available techniques detect the faults associated with the factory assembly line using customized sensors. For instance, the customized sensors may be manually installed in specific locations where the faults are known to occur. However, when an unexpected fault occurs, these available techniques may fail to detect the unexpected fault because the customized sensors are not installed in a place where the unexpected fault occurs and/or the customized sensors are not configured to detect the unexpected fault. Further, the installation of multiple customized sensors to detect both the expected faults and unexpected faults may be a time-consuming and expensive process.

Accordingly, there is a need for a system that detects expected and unexpected faults associated with such automation in an efficient and feasible manner.

SUMMARY

In order to solve the foregoing problem, it is an objective of some embodiments to adapt anomaly detection to video anomaly detection from a video camera overlooking an automation scenario, such as the factory assembly line. As used herein, 'anomaly' may correspond to faults associated with the automation scenario. For instance, the faults associated with the factory assembly line may include an abnormal orientation of a robot arm, unexpected stop of a conveyor, and/or the like. In the video anomaly detection, some embodiments aim to automatically detect an activity (e.g. an operation of a machine) in a part of a video as the anomaly when the activity is different from activities seen in a normal video of a same scene. Thereby, the detected anomaly includes both the expected and unexpected faults associated with the factory assembly, because every different activity from the activities of the normal video is detected as the anomaly. Further, the video anomaly detection may reduce a cost of detecting the anomaly in the factory automation in comparison to techniques that aim to detect the anomaly by installing customized sensors. For instance, the video anomaly detection may be cheaper than these techniques because the video anomaly detection does not use the customized sensor for detecting the anomaly.

In order to detect the anomaly, some embodiments aim to build a model using the normal video. Hereinafter, 'normal video' and 'training video' may be interchangeably used to mean the same. As used herein, 'training video' may correspond to a video that includes a set of video frames corresponding to normal operation(s) of a machine performing a task in the automation scenario. In an example embodiment, the model may be built for the training video by partitioning the training video into multiple spatio-temporal regions and learning separate models for each spatial region of the video. For instance, each spatio-temporal region may be defined by a video bounding box. For example, the video bounding box includes a spatial dimension and a temporal dimension to partition the training video into multiple spatio-temporal regions. Further, a feature vector may be computed for short sequences of the training video and all 'unique' feature vectors occurring in each spatial region may be stored as the model. The short sequences of video in a spatial region (i.e. a spatio-temporal region) may be referred to as sequences of training image patches. The unique feature vectors occurring in each spatial region may be referred to as 'exemplars.'

It is also an objective of some embodiments to compute the feature vector for each sequence of training image patches such that the computed feature vector is simple but accurate enough to represent anomalous patterns of time-series motion data in the automation scenario. To this end, some embodiments use a motion feature vector that defines a temporal variation of counts of predetermined patterns. For instance, the predetermined patterns may be indicative of different kinds of motion captured in the video. The use of counts of the predetermined patterns of motion instead of the patterns themselves simplifies the motion feature vector while preserving some motion information. Some embodiments use binary difference images of consecutive frames of the training video to compute a motion feature vector. A binary difference image shows a threshold difference of two frames indicative of relative motion captured by these two frames. The patterns formed by above threshold "one" or below threshold "zero" pixels of the binary difference image are the predetermined patterns counted by the motion feature vector. Further, the use of the temporal variation of counts allows considering motion over time, which is advantageous for factory automation. Furthermore, the considerations of only predetermined patterns and the counts of the predetermined patterns allow having the motion feature vector of fixed size, which is advantageous for distance-based anomaly detection.

During the control of the machine performing the task, an input testing video, e.g., from the same stationary camera used to acquire the training video, is processed in the same way to produce input motion feature vectors which are compared against the motion feature vectors derived from the training video for the corresponding spatial regions to detect the anomaly. In an example embodiment, a minimum distance (e.g., an Euclidean distance) between each input motion vector and the training motion vectors of the same spatial region may be computed. Further, the computed minimum distances may be compared with an anomaly detection threshold to detect the anomaly. For instance, the anomaly in the input video may be detected, when at least one computed minimum distance is greater than the anomaly detection threshold. The use of simplified feature vector (i.e. the motion feature vectors from the training and testing videos) enables the detection of anomalies in the input testing video in a feasible manner.

In addition to the motion feature vectors, some embodiments use appearance feature vectors representing appearance information in the video. The appearance information is optional, but advantageous in complementing the motion feature vectors to consider context of motion variations without a need for additional sensors, while detecting the anomaly. In such a manner, the hardware requirements for the anomaly detection can be reduced. In one embodiment, a histogram of oriented gradients (HoG) feature computed for an image patch of a video volume may be used as the appearance information. In another embodiment, a binary difference image computed for two consecutive image patches of the video patch may be used as the appearance information.

Accordingly, one embodiment discloses a system for detecting an anomaly in a video of a factory automation scene, the system comprising: a processor; and a memory having instructions stored thereon that, when executed by the processor, cause the system to: accept an input video of a scene including a machine performing a task; accept a set of training feature vectors derived from spatio-temporal regions of a training video of a normal operation of the machine performing the task, wherein a spatio-temporal region is associated with one or multiple training feature vectors, each training feature vector includes a motion feature vector defining a temporal variation of counts of predetermined patterns; partition the input video into multiple sequences of video volumes corresponding to spatial and temporal dimensions of the spatio-temporal regions of the training video, such that a video volume includes a sequence of image patches defined by a spatial dimension and a temporal dimension of the corresponding spatio-temporal region; determine a binary difference image for each consecutive pair of image patches in the sequence of image patches of each of the video volumes to produce a sequence of binary difference images for each of the video volumes; count occurrences of each of the predetermined patterns of pixels in each binary difference image for each of the video volumes to produce an input feature vector including an input motion feature vector defining a temporal variation of counts of the predetermined patterns for each of the video volumes; compute a minimum distance between the input feature vector of each of the video volumes and the training feature vectors associated with corresponding spatial regions in the scene to produce a set of distances; and compare each distance from the set of distances with an anomaly detection threshold to detect anomalies in the input video of the scene.

Another embodiment discloses a method for detecting an anomaly in a video of a factory automation scene, the method comprising: accepting an input video of a scene including a machine performing a task; accepting a set of training feature vectors derived from spatio-temporal regions of a training video of a normal operation of the machine performing the task, wherein a spatio-temporal region is associated with one or multiple training feature vectors, each training feature vector includes a motion feature vector defining a temporal variation of counts of predetermined patterns; partitioning the input video into multiple sequences of video volumes corresponding to spatial and temporal dimensions of the spatio-temporal regions of the training video, such that a video volume includes a sequence of image patches defined by a spatial dimension and a temporal dimension of the corresponding spatio-temporal region; determining a binary difference image for each consecutive pair of image patches in the sequence of image patches of each of the video volumes to produce a sequence of binary difference images for each of the video volumes; counting occurrences of each of the predetermined patterns of pixels in each binary difference image for each of the video volumes to produce an input feature vector including an input motion feature vector defining a temporal variation of counts of the predetermined patterns for each of the video volumes; computing a minimum distance between the input feature vector of each of the video volumes and the training feature vectors associated with corresponding spatio-temporal regions in the scene to produce a set of distances; comparing each distance from the set of distances with an anomaly detection threshold to detect anomalies in the input video of the scene.

Yet another embodiment discloses a system for detecting an anomaly in a video of a factory automation scene, the system comprising: a processor; and a memory having instructions stored thereon that, when executed by the processor, cause the system to: accept an input video of a scene including a machine performing a task; accept a set of training feature vectors derived from spatio-temporal regions of a training video of a normal operation of the machine performing the task, wherein a spatio-temporal region is associated with one or multiple training feature vectors, each training feature vector consists of an appearance feature vector and a motion feature vector; partition the input video into multiple sequences of video volumes corresponding to spatial and temporal dimensions of the spatio-temporal regions of the training video, such that a video volume includes a sequence of image patches defined by a spatial dimension and a temporal dimension of the corresponding spatio-temporal region; determine a binary difference image for each consecutive pair of image patches in the sequence of image patches of each of the video volumes to produce a sequence of binary difference images for each of the video volumes; count occurrences of each of the predetermined patterns of pixels in each binary difference image for each of the video volumes to produce an input motion feature vector defining a temporal variation of counts of the predetermined patterns for each of the video volumes; compute an input appearance feature vector for each of the video volumes, wherein the input appearance feature vector represents the pattern of pixels occurring in a video volume; compute a minimum distance between the input motion feature vector of each of the video volume and the motion feature vector of the training feature vectors associated with corresponding spatio-temporal regions in the scene to produce a set of motion distances; compute a minimum distance between the input appearance feature vector of each of the video volumes and the appearance feature vector of the training feature vectors associated with corresponding spatio-temporal regions in the scene to produce a set of appearance distances; and compare each motion and appearance distance from the set of motion and appearance distances with at least one anomaly detection threshold to detect anomalies in the input video of the scene.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1:
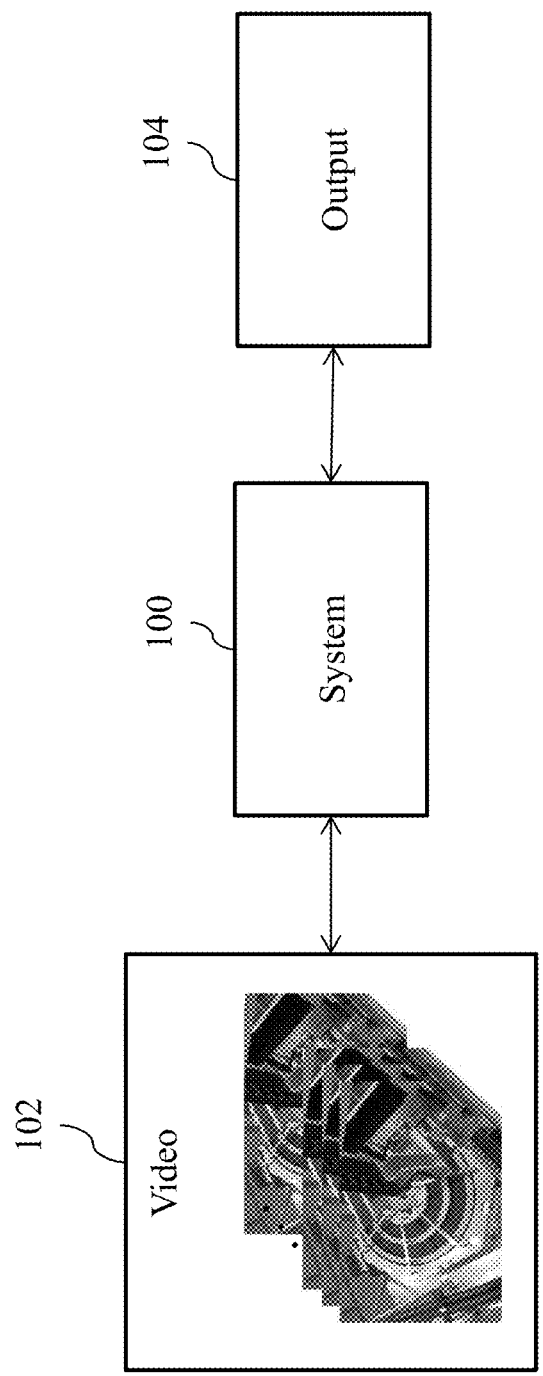
FIG. 1 illustrates an overview of a system for detecting an anomaly in a video, according to some embodiments of the present disclosure.

FIG. 1 illustrates an overview of a system 100 for detecting an anomaly in a video 102, according to some embodiments of the present disclosure. According to an embodiment, the video 102 may include a set of video frames that correspond to an automation scene, such as a factory automation scene. As used herein, 'factory automation' may be a process of automatically manufacturing a complex system using one or more machines. For example, the factory automation may be realized as a factory assembly line, where various raw materials of the complex system are automatically assembled using the one or more machines to manufacture the complex system. For instance, the complex system may be a vehicle or the like. The one or more machines may include, but are not limited to, robot arm(s), a conveyor, and/or the like. As used herein, 'factory automation scene' may correspond to a scene that is indicative of the one or more machines performing a task to achieve the factory automation.

During the factory automation process, in certain scenarios, the one or more machines may encounter fault(s). For example, the faults associated with the one or more machines may include, but are not limited to, an abnormal orientation of the robot arm, the one or more machines stopping unexpectedly during the factory automation process, and/or the like. Hereinafter, 'the faults of the one or more machines' and 'anomaly' may be interchangeably used.

According to an example embodiment, the system 100 may be configured to detect the anomaly in the factory automation process. In such a case, the system 100 may detect the anomaly in the factory automation process using the video 102 of the factory automation scene. To that end, the system 100 may obtain the video 102 from an imaging device that is monitoring one or more machines performing the task within a factory premises. Accordingly, when the one or more machines encounter faults, the faults are reflected within the video 102 obtained from the imaging device. For instance, the imaging device may be a camera, a video player, or the like. The system 100 may process the video 102 to detect the anomaly in the factory automation process.

Further, the system 100 may provide an output 104 in response to detecting the anomaly. In one embodiment, the output 104 may be control signal(s) to control the one or more machines to stop anomalous activities. In another embodiment, the output 104 may be a notification to a user to stop the anomalous activities. The system 100 may detect the anomaly in the video 102 of the factory automation scene as explained further with reference to FIG. 2A.

Figure 2A:
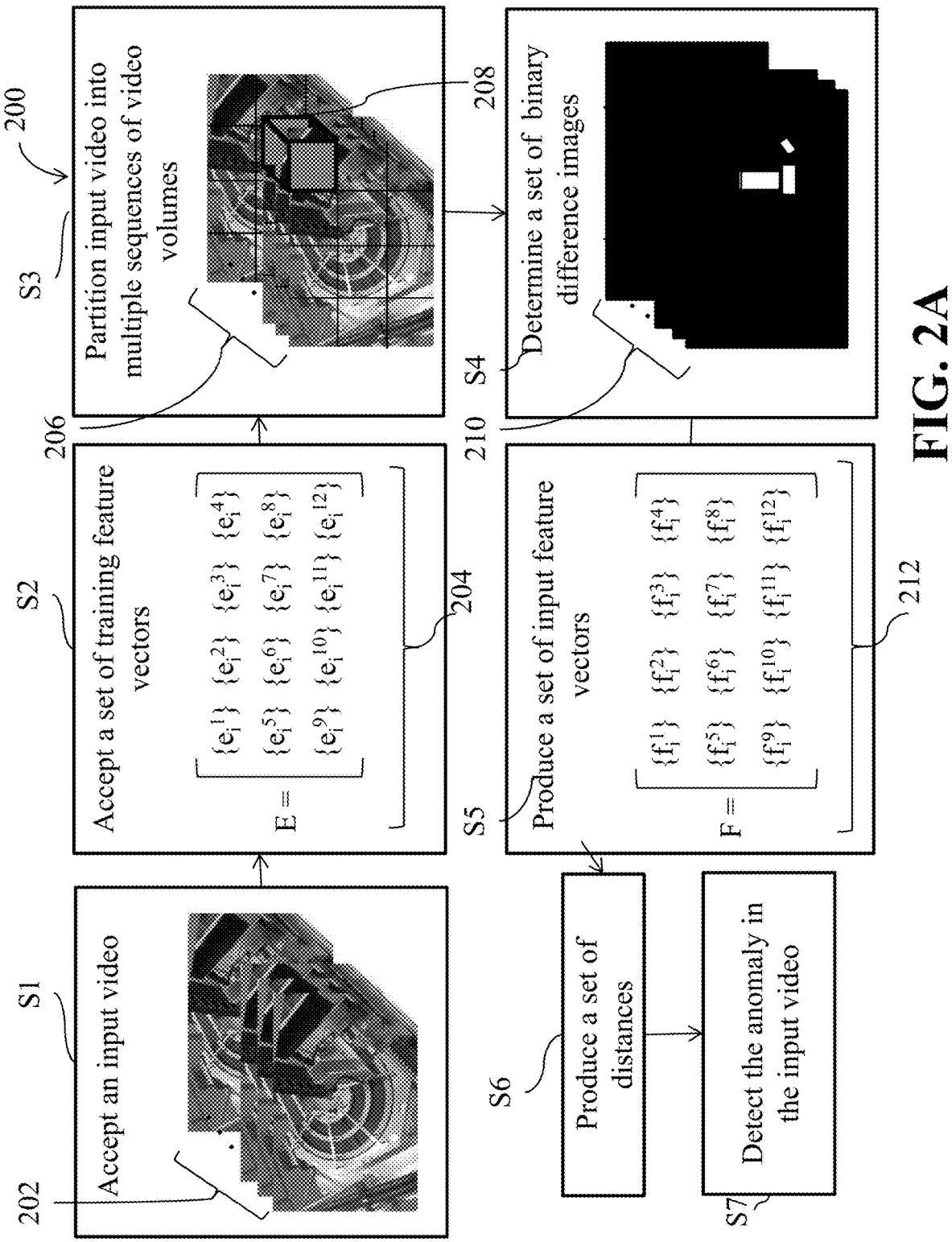
FIG. 2A illustrates a flowchart for detecting the anomaly in an input video of a factory automation scene, according to some embodiments of the present disclosure.

FIG. 2A illustrates a flowchart 200 for detecting the anomaly in an input video of the factory automation scene, according to some embodiments of the present disclosure. FIG. 2A is explained in conjunction with FIG. 1. The flowchart 200 may be executed by the system 100. The flowchart 200 may correspond to a testing phase of the system 100.

At step S1, the system 100 may accept an input video 202. The input video 202 may correspond to the video 102 of the factory automation scene. For instance, the input video 202 may include the set of video frames that correspond to the scene including one or more machines performing the task.

At step S2, the system 100 may accept a set of training feature vectors 204. The set of training features 204 may be derived from a training video. The training video may include a set of video frames that correspond to a normal operation of the one or more machines performing the task. As used herein, 'normal operation of the one or more machines' may correspond to activities (operations) of the one or more machines without any anomaly. As used herein, 'training features' may correspond to values or information extracted from the video frames of the training video. In an example embodiment, the set of training feature vectors 204 may be derived from spatio-temporal regions of the training video. For example, one or multiple training feature vectors may be derived for each spatial region of the training video. In some cases, the set of training feature vectors 204 may be a matrix E (shown in FIG. 2A), where each element of the matrix E includes one or multiple training feature vectors of a respective spatial region of the training video.

The spatio-temporal regions of the training video may be defined by a video bounding box. The video bounding box may include a spatial dimension and a temporal dimension for partitioning (or splitting) the training video into multiple spatio-temporal regions. The spatial dimension may include a size (width, height) of an image patch (e.g., a portion of the image frame). The temporal dimension may include a number of the video frames where the number of image frames may be less then a number of the image frames in the training video. In an example embodiment, each training feature vector associated with one particular spatio-temporal region includes a motion feature vector. As used herein, 'motion feature vector' may be values or information that defines motion information associated with the one or more machines in that particular spatio-temporal region. For instance, the motion feature vectors may be derived from the training video, as explained further with reference to FIG. 3.

At step S3, the system 100 may partition the input video 202 into multiple sequences of video volumes. For example, the system 100 may partition the input video 202 into the multiple sequences of video volumes as explained in the detailed description of FIG. 2B.

Figure 2B:
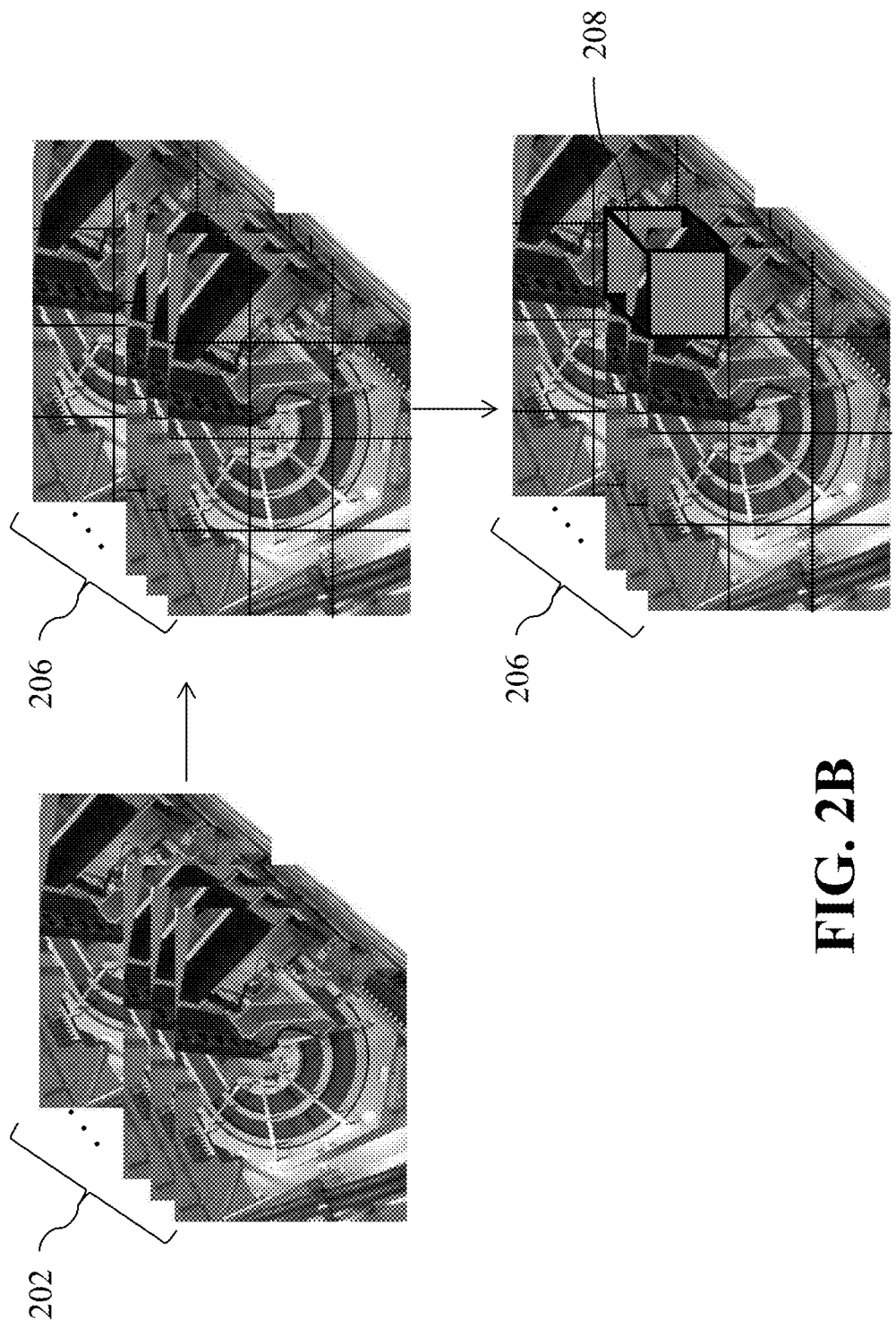
FIG. 2B illustrates a pipeline for partitioning the input video into multiple sequences of video volumes, according to some embodiments of the present disclosure.

FIG. 2B illustrates a pipeline for partitioning the input video 202 into multiple sequences of video volumes 208, according to some embodiments of the present disclosure. In an example embodiment, the system 100 may use the video bounding box to partition the input video 202 into multiple spatio-temporal regions. Thereby, the system 100 produces a partitioned input video 206. For instance, the video bounding box may be moved spatially with a fixed step size in both horizontally and vertically to produce a set of (possibly overlapping) spatial regions. In one embodiment, the video bounding box may also be moved temporally one frame at a time for each of the spatial regions to produce a sequence of overlapping spatio-temporal regions within each of the spatial regions. For instance, each overlapping spatio-temporal region of the sequence of overlapping spatio-temporal regions may correspond to a video volume. The same set of spatial regions are used for both the training video and the input testing video.

Referring back to FIG. 2A, at step S4, the system 100 may determine a set of binary difference images 210 for the multiple sequences of the video volumes. In order to determine the set of binary difference images 210, the system 100 may produce a sequence of binary difference images for each video volume. For example, the system 100 may produce the sequence of binary difference images for a particular video volume as explained further with reference to FIG. 2C.

Figure 2C:
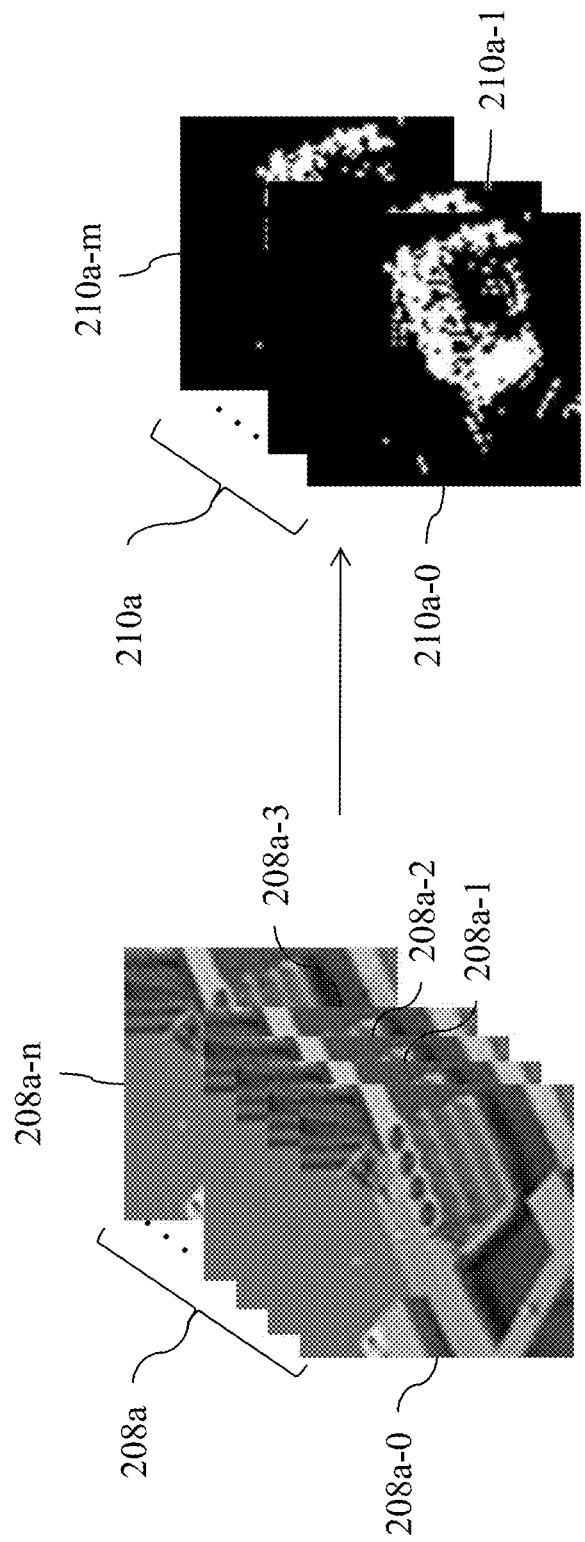
FIG. 2C illustrates a schematic diagram for producing a sequence of binary difference images for a video volume, according to some embodiments of the present disclosure.

FIG. 2C illustrates a schematic diagram for producing a sequence of binary difference images 210a for a video volume 208a, according to some embodiments of the present disclosure. FIG. 2C is explained in conjunction with FIG. 2A. The video volume 208a may correspond to one particular video volume 208 of the multiple sequences of video volumes. For instance, the video volume 208a may include n+1 image patches, for example, image patches 208a-0, 208a-1, 208a-2, 208a-3 . . . 208a-n.

In order to produce the sequence of binary difference images 210a, the system 100 may determine a binary difference image for each consecutive pair of image patches in the sequence of image patches 208a-0, 208a-1, 208a-2, 208a-3 . . . 208a-n. For example, the system 100 may determine a binary difference image 210a-0 for a consecutive pair of image patches 208a-0 and 208a-1. In order to determine the binary difference image 210a-0, the system 100 may determine pixel difference values between the image patch 208a-0 and the image patch 208a-1 to produce a difference image. As used herein, 'pixel difference value' may be an absolute value of difference between (i) an intensity value of a first pixel of the image patch 208a-0 and (ii) an intensity value of a second pixel of the image patch 208a-1 corresponding to the first pixel of the image patch 208a-0. As used herein, the difference image may be an image whose pixel values are the pixel difference values.

Further, the system 100 may threshold the pixel values of the difference image to produce the binary difference image 210a. For example, the system 100 may check if each of the pixel difference values is greater than a threshold pixel difference value. In an embodiment, if a particular pixel difference value is greater than the threshold pixel difference value, the system 100 may assign a value of '1' to the pixel corresponding to the particular pixel difference value. Otherwise, the system 100 may assign a value of '0' to the pixel corresponding to the particular pixel difference value. Thus, the produced binary difference image 210a is a binary image indicating which pixels significantly change from the image patch 206a-0 to the image patch 208a-1.

Similarly, the system 100 may determine a binary difference image 210a-1 for a consecutive pair of image patches 208a-1 and 208a-2. In this way, the system 100 may iteratively determine the binary difference image from each consecutive pair of image patches in the sequence of image patches 208a-0, 208a-1, 208a-2, 208a-3 . . . 208a-n to produce the sequence of binary difference images 210a-0, 210a-1 . . . 210a-m.

Referring back to FIG. 2A, similarly, the system 100 may produce the sequence of binary difference images for each video volume of the input video 202 to determine the set of binary difference images 210. Once the set of binary difference images 210 is determined, the system 100 may proceed with step S5.

At step S5, the system 100 may produce a set of input feature vectors 212, based on the determined set of binary difference images 210. For instance, the set of input feature vectors 212 may be a matrix F (shown in FIG. 2A), where each element of the matrix F includes one or multiple input feature vectors for a respective spatio-temporal region of the input video 202 Accordingly, to produce the set of input feature vectors 212, the system 100 may produce an input feature vector for each video volume of the multiple sequences of the video volumes. In an example embodiment, the system 100 may produce the input feature vector for one particular video volume, based on the sequence of binary difference images determined for that particular video volume. For example, the system 100 may produce the input feature vector for one particular video volume as explained in the detailed description of FIG. 2D.

Figure 2D:
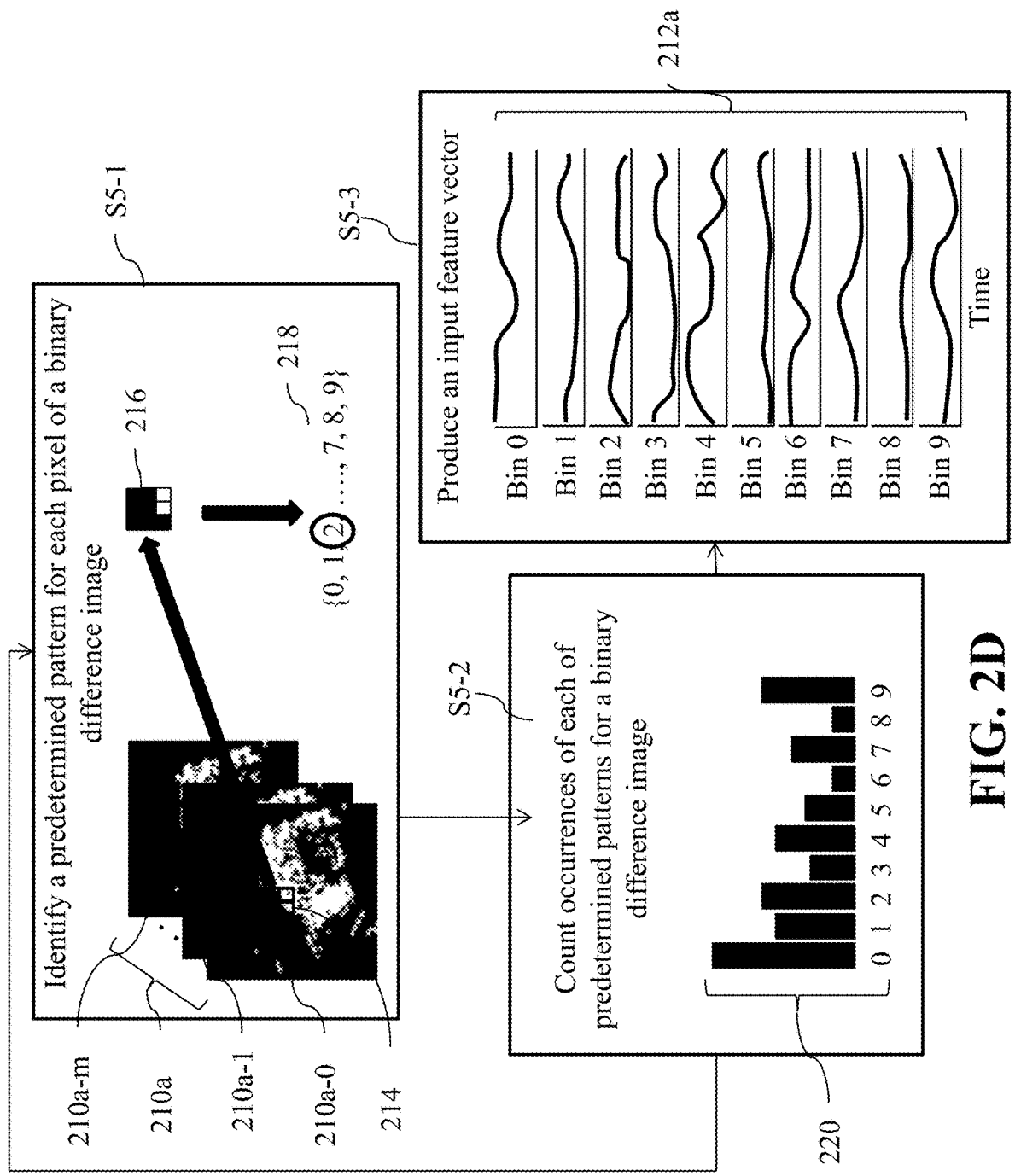
FIG. 2D illustrates a pipeline for producing an input feature vector for a particular video volume, according to some embodiments of the present disclosure.

FIG. 2D illustrates a pipeline for producing an input feature vector 212a for a particular video volume, according to some embodiments of the present disclosure. FIG. 2D is explained in conjunction with FIG. 2A and FIG. 2C. For instance, the particular video volume may be the video volume 206a of the input video 202. For instance, the sequence of binary difference images associated with the particular video volume may be the sequence of binary difference images 210a. In an example embodiment, the system 100 may produce the input feature vector 212a for the video volume 206a, based on the sequence of binary difference images 210a.

In order to produce the input feature vector 212a, the system 100 may identify a predetermined pattern for each pixel of a binary difference image in the sequence of binary difference images 210a, at step S5-1. For instance, the system 100 may identify the predetermined pattern for each pixel of the binary difference image 210a-0. In an example embodiment, to identify the predetermined pattern for one particular pixel of the binary difference image 210a-0, the system 100 may apply a window 214 on that particular pixel. According to an embodiment, a size associated with the window 214 may be smaller than a size of the binary difference image 210a-0. For instance, the size of the window 214 is three pixels wide and three pixels long covering nine pixels. On application of the window 214 on the particular pixel, the window 214 defines 3-pixel by 3-pixel neighborhoods 216 occurring in the binary difference image 210a-0 for that particular pixel. As used herein, 'predetermined pattern' may be a specific number of bright ('1' value) or dark ('0' value) pixels within the window 216. In other words, 'predetermined pattern' may be a count of the number of above threshold pixels within the window 216. Since the window 214 covers nine pixels, there are ten possible predetermined patterns 218 such as zero number of above threshold pixels, one number of above threshold pixels, . . . , and nine number of above threshold pixels. For instance, if the above threshold pixels correspond to the bright pixels, the system 101 may identify number '2' as the predetermined pattern for the particular pixel corresponding to the 3-pixel by 3-pixel neighborhoods 216. In this way, the system 100 may iteratively apply the window for each pixel of the binary difference image 210a-0 to identify the predetermined pattern for each pixel of the binary difference image 210a-0.

At step S5-2, the system 100 may count occurrences of each of the predetermined patterns 218 of pixels in the binary difference image 210a-0 to formulate a histogram 220. For instance, the histogram 220 may include ten bins such that each bin of the histogram 220 is associated with a respective predetermined pattern of the predetermined patterns 218. For example, at step S5-2, the system 100 may increase a value of one particular bin by '1' to formulate the histogram 220, if the predetermined pattern corresponding to that particular bin is identified in step S5-1. Thus, the formulated histogram 220 is the counts of the number of above threshold pixels in every 3-pixel by 3-pixel neighborhoods occurring in the binary difference image 210a-0. Therefore, the formulated histogram 220 encodes motion information associated with the one or more machines in one consecutive pair of image patches (e.g. the image patches 206a-0 and 206a-1). Once the histogram 220 for the binary difference image 210a-0 is formulated, the system 100 may again proceed with the step S5-1 to iteratively execute the steps S5-1 and S5-2 to formulate the histogram for each binary difference image in the sequence of binary difference images 210a.

At step S5-3, the system 100 may produce the input feature vector 212a by concatenating the formulated histograms associated with the binary difference images of the sequence of binary difference images 210a. Hereinafter, the input feature vector 212a may be referred to as an input motion feature vector, since the input feature vector 212a is produced by concatenating the histograms that encode the motion information associated with the one or more machines. For instance, bin-0 of the input motion feature vector 212a is produced by concatenating values of bin-0s of the formulated histograms over the time. Similarly, bin-1 . . . . bin-9 of the motion feature vector 212a are produced by concatenating values of bin-1s . . . bin-9s of the formulated histograms over the time respectively. Thus, the produced input motion feature vector 212a defines a temporal variation of counts of the predetermined patterns 218. Further, the produced input motion feature vector 212a is simple to compute and compare, because the produced input motion feature vector 212a is the temporal variation of counts of the predetermined patterns 218 rather than patterns that represent arrangement of pixels.

Here for purpose of explanation, in FIG. 2D, the predetermined patterns 218 are considered to be ten patterns. However, the predetermined patterns 218 may include any finite number of patterns. For instance, the predetermined patterns 218 may include five patterns, seventeen patterns, or the like. Accordingly, when the predetermined patterns 218 corresponds to five patterns, then a window of size two pixels wide and two pixels long may be used to produce a motion feature vector having five bins. Alternatively, when the predetermined patterns 218 corresponds to seventeen patterns, then a window of size four pixels wide and four pixels long may be used to produce a motion feature vector having seventeen bins.

In one implementation, the system 100 may accept the predetermined patterns as an input during testing phase and/or training phase. For instance, a designer may select the predetermined patterns from a library of patterns based on the task performed by the one or more machines such that the selected predetermined patterns provide accurate results for the performed task among other patterns in the library of patterns. For example, the library of patterns may include five patterns, ten patterns, seventeen patterns, and the like. In another implementation, the system 100 may select the predetermined patterns from the library of patterns using trained machine learning models. For instance, the machine learning models may be trained to select the predetermined patterns from the library of patterns based on the task performed by the one or more machines such that the selected predetermined patterns provide accurate results for the performed task among other patterns in the library of patterns.

Referring back to FIG. 2A, similarly the system 100 may produce the input motion feature vector 212a defining the temporal variation of counts of the predetermined patterns 218 for each of the video volumes to produce the set of input feature vectors (or a set of input motion feature vectors) 212.

At step S6, the system 100 may produce a set of distances. The set of distances may also be referred to as a set of motion distances. In an example embodiment, to produce the set of distances, the system 100 may compute a minimum distance between the input feature vector of each of the video volumes and the training feature vectors associated with the corresponding spatial regions of the training video. For instance, the system 100 may compute the minimum distance between each element representing the one or multiple input feature vectors (e.g. the one or multiple motion feature vector) of the matrix F and a respective element representing the one or multiple training features of the same spatial region of the matrix E. In an example embodiment, the minimum distance may correspond to a Euclidean distance between the input feature vector of each of the video volumes and the training feature vectors associated with the corresponding spatial regions of the training video.

At step S7, the system 100 may detect the anomaly in the input video 202, based on the produced set of distances. According to an embodiment, the system 100 may compare each distance from the set of distances with an anomaly detection threshold to detect the anomaly in the input video 202 of the factory automation scene. For instance, the anomaly detection threshold may be a threshold value which may be predetermined based on experimentation or the like. In an example embodiment, the system 100 may detect the anomaly in the input video 202 of the factory automation scene when at least one distance in the set of distances is greater than the anomaly detection threshold. Further, the system 100 may execute the control action in response to detecting the anomaly. In one embodiment, the control action may be executed to control the one or more machines to stop anomalous activities. In another embodiment, the control action may be executed to generate a notification to the user to stop the anomalous activity(s).

In this way, the system 100 may detect the anomaly in the factory automation process using the input video 202. Since the anomaly in the factory automation process is detected using the input video 202, a cost of detecting the anomaly in the factory automation process may be significantly reduced in comparison to conventional methods that uses customized sensors to monitor the one or more machines performing the task and detects the anomaly. Thereby, the system 100 detects the anomaly in the factory automation process in an efficient manner. Further, to detect the anomaly in the input video 202, the system 100 produces the input motion feature vectors that are simple to compute and compare. Thereby, the system 100 detects the anomaly in the factory automation process in a feasible manner. Further, the system 100 may produce the motion feature vectors for the training video as explained further with reference to FIG. 3.

Figure 3:
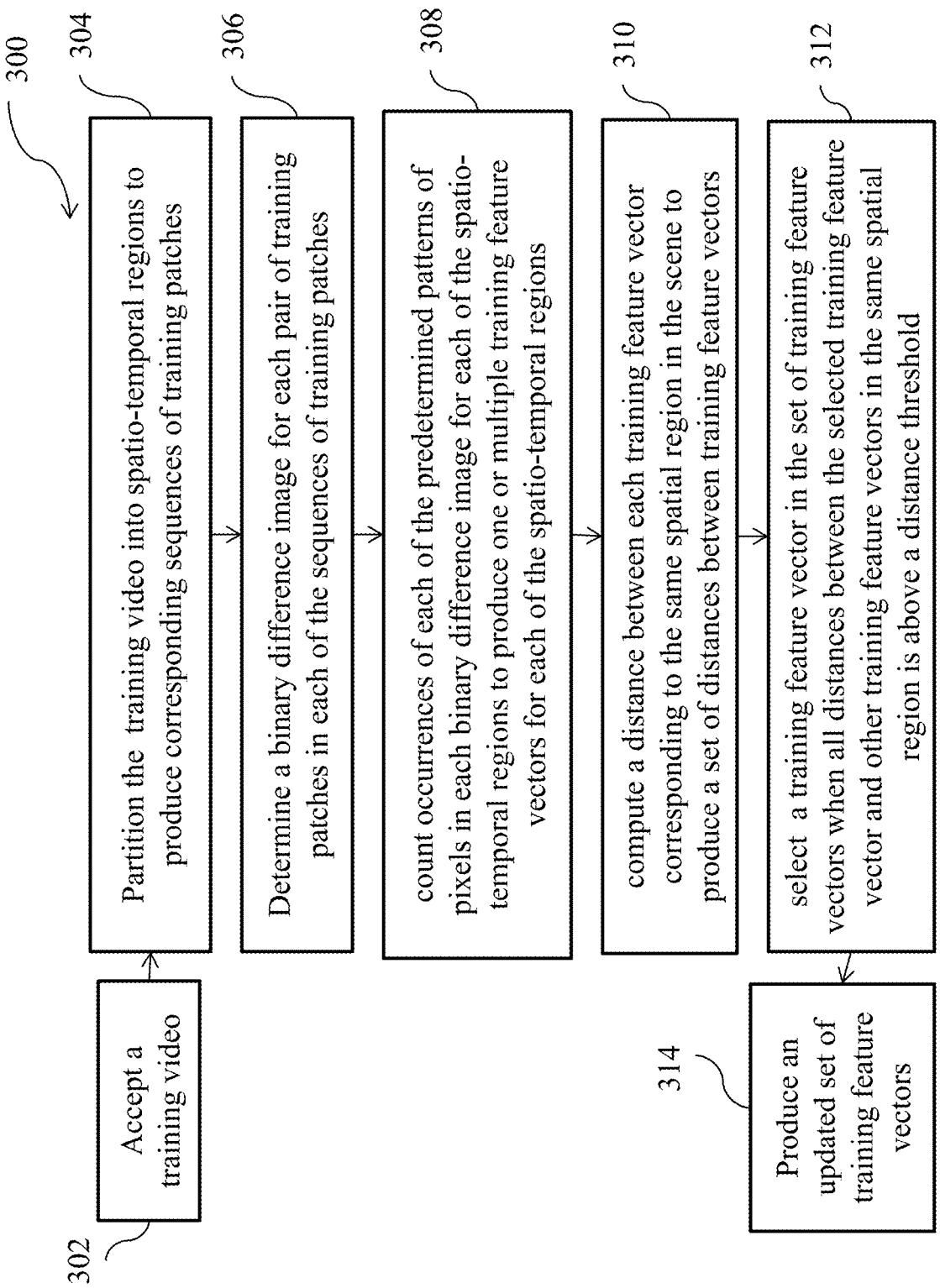
FIG. 3 illustrates a flowchart for producing a set of training feature vectors for training the system for detecting the anomaly in the video, according to some embodiments of the present disclosure.

FIG. 3 illustrates a flowchart 300 for producing a set of training feature vectors for training the system 100 for detecting the anomaly in the video 102, according to some embodiments of the present disclosure. FIG. 3 is explained in conjunction with FIG. 1, FIG. 2A, FIG. 2B, FIG. 2C, and FIG. 2D. The flowchart 300 may be executed by the system 100. The flowchart 300 may correspond a training phase of the system 100. At step 302, the system 300 may accept the training video. For instance, the training video may include the set of video frames that correspond to the normal operation of the one or more machines performing the task.

At step 304, the system 100 may partition the training video into the spatio-temporal regions to produce corresponding sequences of training video volumes. For instance, the system 100 may partition the training video into the spatial regions as explained in the detailed description of FIG. 2B. Further, the system 100 may partition each spatial region into a sequence of training video volumes using a video bounding box as explained in detailed description of FIG. 2B. Thereby, multiple sequences of training video volumes may be produced for the spatial regions of the training video. The sequence of training spatial regions of the training phase corresponds to the spatial regions of the testing phase. The training video volumes represent the normal operation of the one or more machines in the video.

At step 306, the system 100 may determine the binary difference image for each pair of training patches in each of the sequences of training patches. For instance, the system 101 may determine the binary difference image for each pair of training patches as explained in the detailed description of FIG. 2C. Thereby, the set of binary difference images may be determined in the training phase, which may be similar to the set of binary difference images 210.

At step 308, the system 100 may count the occurrences of the predetermined patterns of pixels in each binary difference image for each of the video volumes to produce the one or multiple training feature vectors for each of the video volumes. For instance, the system 100 may produce the one or multiple training feature vectors for each of the video volumes of the training video similarly as explained in the detailed description of FIG. 2A and FIG. 2D. Thereby, each training feature vector of the one or multiple training feature vectors includes the motion feature vector that defines the temporal variation of counts of the predetermined patterns. To this end, a set of training feature vectors may be produced by the system 100. Some embodiments are based on the recognition that the set of training feature vectors includes multiple similar training feature vectors. For instance, at least two training feature vectors may be referred as similar training feature vectors if a distance between the at least two training feature vectors is nearing to zero (or less than a distance threshold). Some embodiments are based on the realization that these multiple similar training feature vectors may add additional computation burden during the testing phase (i.e., while comparing the input feature vector with the training feature vectors of the same spatial region). To this end, it is objective of some embodiments to select one training feature vector (also referred to as a unique training feature vector) from the multiple similar training feature vectors such that the additional computation burden is avoided.

In order to select the training feature vector, the system 100 may compute a distance between each training feature vector corresponding to the same spatial region in the scene to produce a set of distances between the training feature vectors, at step 310. For instance, the system 100 may compute the distance between each training feature vector and each other training feature vector of the same spatial region to produce the set of distances between the training feature vectors.

At step 312, the system 100 may select the training feature vector in the set of training feature vectors when all distances between the selected training feature vector and corresponding feature vector in the set of training feature vectors are above the distance threshold defining a minimum distance among the training feature vectors stored in a memory corresponding to the same spatial region. For instance, for one particular spatial region of the training video, the system may select the training feature vector when the distances between the selected training feature vector and all other training feature vectors of the particular spatial region are above the distance threshold. In an example embodiment, the distance threshold may be determined by the system 100. For instance, the system 100 may calculate a mean of distance between all training feature vectors and the training feature vectors in the set of feature vectors; and increase the mean by a standard deviation to produce the distance threshold. In another embodiment, the distance threshold may be the minimum distance among the training feature vectors of the particular spatial region. In one embodiment, the minimum distance may be a function of the anomaly detection threshold. In this embodiment, the system 100 may select the training feature vector (or multiple training feature vectors) for the particular spatial region when all distances between the selected training feature vector and all other training feature vectors of the particular spatial region are above the anomaly detection threshold. In another embodiment, the minimum distance may be a median distance between all possible pairs of training feature vectors of the particular spatial region. In this embodiment, the system 100 may select the training feature vector (or multiple training feature vectors) for the particular spatial region when all distances between the selected training feature vector and all other training feature vectors of the particular spatial region are above the median distance.

At step 314, the system 100 may produce an updated set of training feature vectors.

In an example embodiment, the updated set of training feature vectors may be used in the testing phase for detecting the anomaly(s) in the input testing video. For instance, the updated set of training feature vectors may correspond to the set of training feature vectors 204.

In this way, in the training phase, the system 100 produces the set of training features 204 such that the additional computation burden during the testing phase is avoided. In certain scenarios, a context of motion variations may be important to consider. In order to consider the context of the motion variation, it is objective of some embodiments to use appearance feature vectors in addition to the motion feature vectors. In an example embodiment, each of the training feature vectors and each of the input feature vectors may further include a corresponding appearance feature vector derived from a content of a video volume. For instance, the system 100 may compute the appearance feature vector for the video volume as explained further with reference to FIG. 4.

Figure 4:
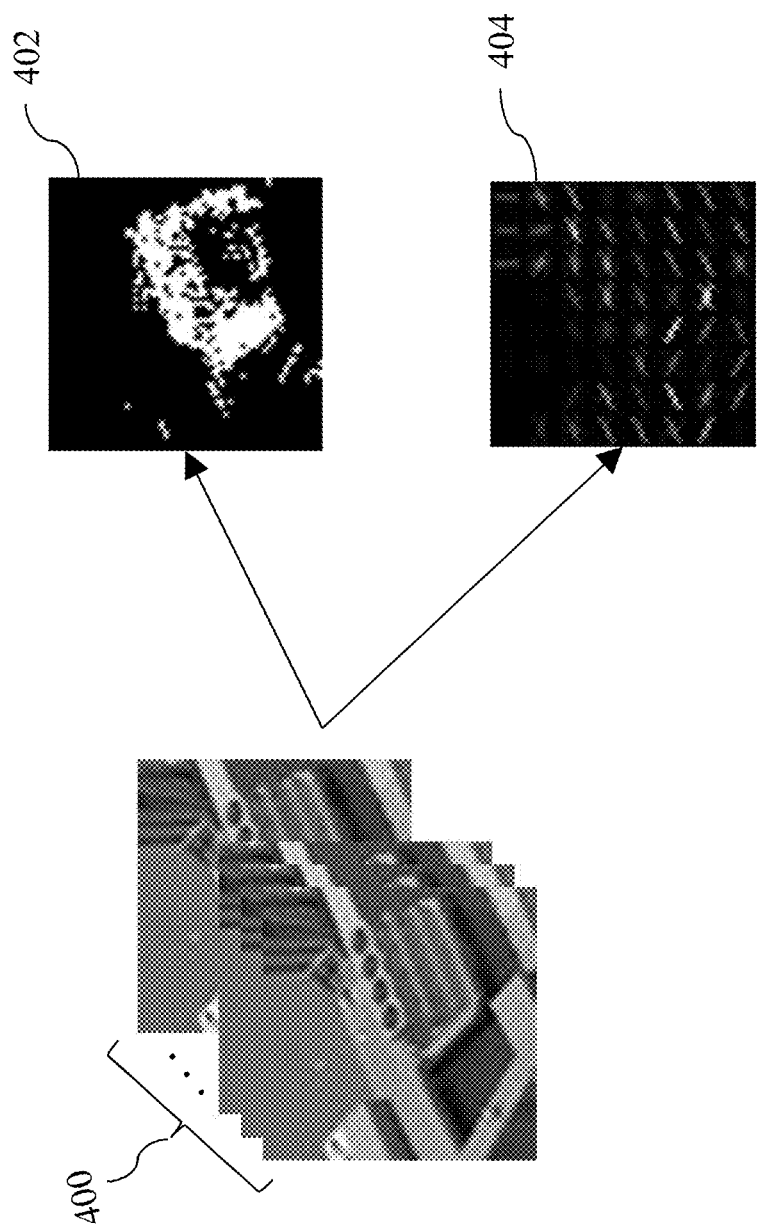
FIG. 4 illustrates a schematic diagram for computing an appearance feature vector for a video patch, according to some embodiments of the present disclosure.

FIG. 4 illustrates a schematic diagram for computing the appearance feature vector for a video volume 400, according to some embodiments of the present disclosure. FIG. 4 is explained in conjunction with FIG. 1, FIG. 2A, FIG. 2C, and FIG. 3. In the training phase of the system 100, the video volume 400 may correspond to the sequence of training patches of the training video. According to an embodiment, the system 100 may compute the appearance feature vector for the video volume 400 such that the computed appearance feature vector represents a pattern (e.g. spatial arrangement) of pixels occurring in the video volume 400. In an embodiment, to compute the appearance feature vector that represents the pattern of pixels occurring in the video volume 400, the system 100 may compute a binary difference image 402 from two consecutive video frames of the video volume 400. For instance, the system 100 may compute the binary difference image 402 as explained in the detailed description of FIG. 2C. In this embodiment, the determined binary difference image 402 may be the appearance feature vector.

In another embodiment, the system 100 may compute a histogram of oriented gradients (HoG) representation 404 for a single image frame of the video volume 400. In this embodiment, the appearance feature vector for the video volume 400 may be the HoG representation 404. For instance, to compute the HoG representation 404, the system 100 may extract a brightness gradient magnitude and brightness gradient orientation (i.e. a direction) for each pixel of the single image frame. For example, to extract the gradient magnitude and the orientation for one particular pixel, the system 100 may determine a change in brightness in the x-direction $(G_x)$ for the particular pixel and further determine a change in brightness in the y-direction $(G_y)$ for the particular pixel. The gradient magnitude for the particular pixel may be numerically equal to $\sqrt{[(G_x)^2+(G_y)^2]}$. The orientation for the particular pixel may be numerically equal to $\tan^{-1}G_y/G_x$. For instance, the change in brightness in the x-direction $(G_x)$ is determined by subtracting the pixel value to the left from the pixel value to the right of the particular pixel. For instance, the change in y-direction $(G_y)$ is determined by subtracting the pixel value above from the pixel value below the particular pixel.

In a testing phase of the system 100, the video volume 400 may correspond to one particular video volume (e.g. the video volume 206a) of the input video 202. Further, the appearance feature vector computed from the video volume 400 may be referred to as an input appearance feature vector, in the testing phase of the system 100. In one embodiment, the system 100 may compute the binary difference image 402 for the video volume 400 and use the computed binary difference image 402 as the input appearance feature vector. In another embodiment, the system 100 may compute the HoG representation 404 for the video volume 400 and use the computed HoG representation 404 as the input appearance feature vector.

In some embodiments, in the testing phase, the system 100 may use the computed input appearance feature vectors along with the input motion feature vectors to detect the anomaly in the factory automation scene. For instance, the testing phase of the system 100 that uses the input appearance feature vectors and the input motion feature vectors to detect the anomaly in the factory automation scene is as explained further with reference to FIG. 5.

Figure 5:
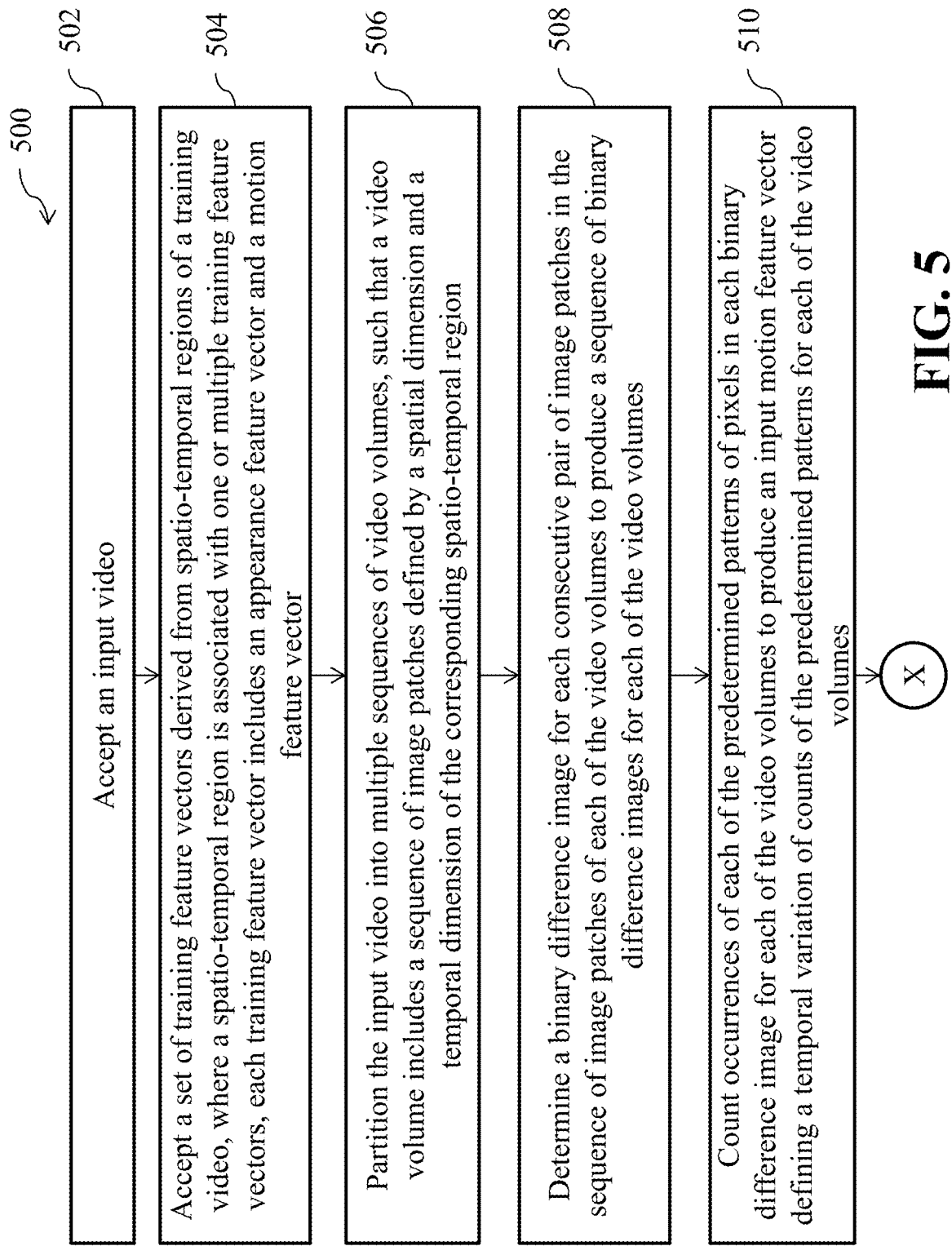
FIG. 5 illustrates a flowchart for detecting the anomaly in the video of the factory automation scene, according to some other embodiments of the present disclosure.
Figure 5:
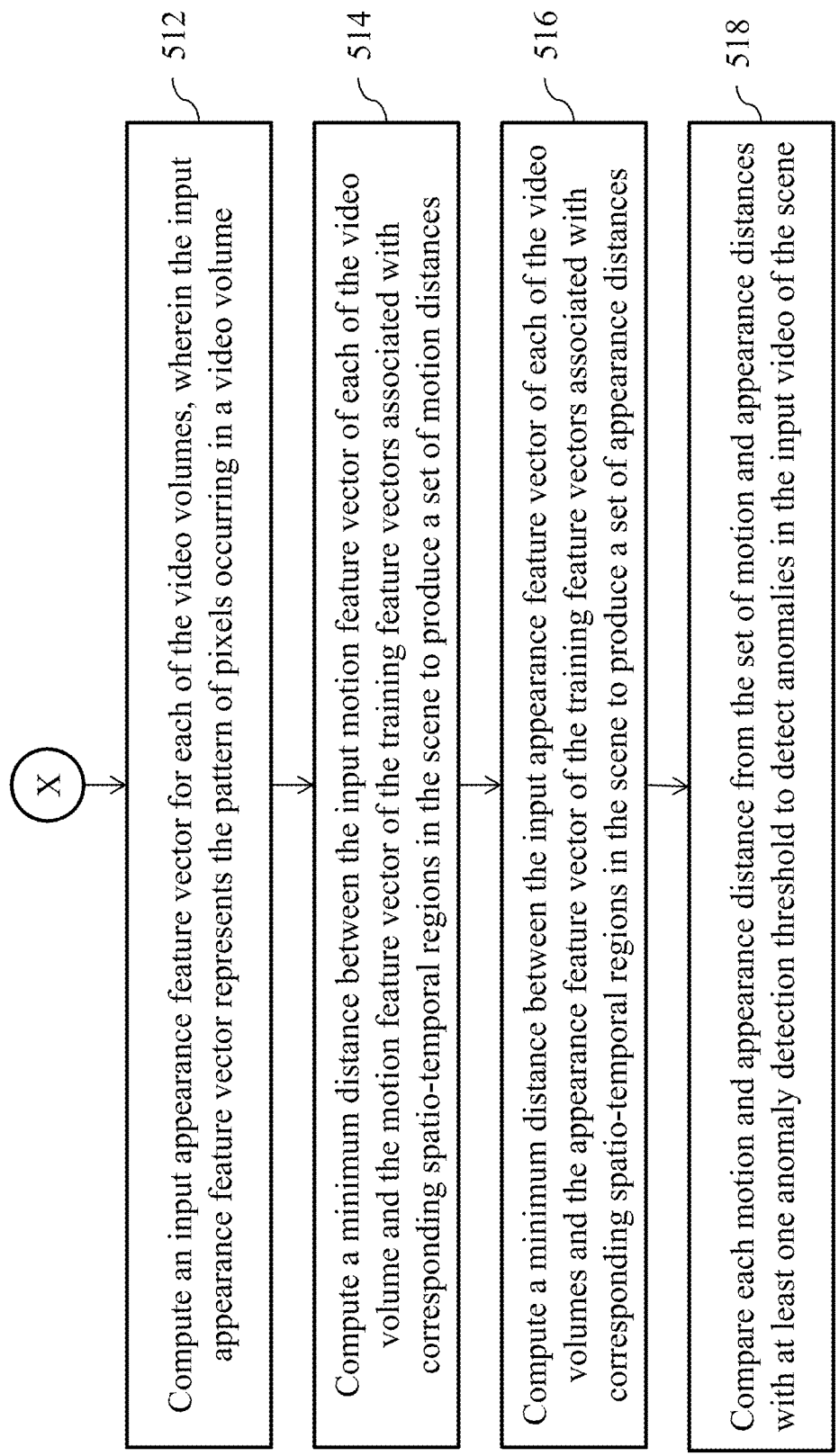

FIG. 5 illustrates a flowchart 500 for detecting the anomaly in the video of the factory automation scene, according to some other embodiments of the present disclosure. FIG. 5 is explained in conjunction with FIG. 1, FIG. 2A, FIG. 2B, FIG. 2C, FIG. 2D, FIG. 3, and FIG. 4. The flowchart 500 may be executed by the system 100. The flowchart 500 may correspond to the testing phase of the system 100. At step 502, the system 100 may accept the input video. For instance, the input video may correspond to the input video 202 of the factory automation scene.

At step 504, the system 100 may accept the set of training feature vectors derived from the spatio-temporal regions of the training video. For instance, the accepted set of training feature vectors may correspond to the matrix E, where each element of the matrix E corresponds to the one or multiple training feature vectors associated with one particular spatial region. In an example embodiment, each training feature vector may consist of the appearance feature vector and the motion feature vector. For instance, each training feature vector may be a concatenation of the appearance feature vector and the motion feature vector, which may be represented by $e_1^{\,1}=[m_1\ a_1]$ where the notation 'm' indicates the motion feature vector and the notation 'a' indicates the appearance feature vector.

At step 506, the system 100 may partition the input video into the multiple sequences of video volumes. For instance, the system 100 may partition the input video into the multiple sequences of video volumes using the video bounding box as explained in the detailed description of FIG. 2B. To this end, the system 100 may produce the multiple sequences of video volumes for the input video such that each video volume includes the sequence of image patches defined by the spatial dimension and temporal dimension of the corresponding spatio-temporal region.

At step 508, the system 100 may determine the binary difference image for each consecutive pair of image patches in the sequence of image patches of each of the video volumes to produce the sequence of binary difference images for each of the video volumes. For instance, the system 100 may determine the binary difference image for each pair of image patches in the sequence of image patches of each of the video volumes as explained in the detailed description of FIG. 2C.

At step 510, the system 100 may count the occurrence of each of the predetermined patterns of pixels in each binary difference image for each of the video volumes to produce an input motion feature vector for each of the video volumes. For instance, the system 100 may produce the input motion feature vector for each of the video volumes as explained in the detailed description of FIG. 2A and FIG. 2D. The input motion feature vector may define the temporal variation of counts of the predetermined patterns.

At step 512, the system 100 may compute the input appearance feature vector for each of the video volumes. For instance, the system 100 may compute the input appearance vector for each video volume as explained in the detailed description of FIG. 4. The computed input appearance feature vector may represent the pattern of the pixels occurring in the video volume.

At step 514, the system 100 may compute the minimum distance between the input motion feature vector of each video volume and the motion feature vector of the training feature vectors associated with the same spatial regions in the scene to produce a set of motion distances. For instance, the system 100 may produce the set of motion distances as explained in the detailed description of FIG. 2A. For example, the distance may be the Euclidean distance between the input motion feature vector and the motion feature vector. For instance, the distance ('$d_m$') between the input motion feature vector ('$m_1$') and the motion feature vector ('$m_2$') is computed as: $d_m = \Sigma_{i=1}^{b}((m_1(i)-m_2(i))^2)$ where the notation 'b' may be a number of elements in a motion feature vector.

At step 516, the system 100 may compute a minimum distance between the input appearance feature vector of each video volume and the appearance feature vector of the training feature vectors associated with the same spatial regions in the scene to produce a set of appearance distances. For instance, the system 100 may compute the minimum distance (e.g., the Euclidean distance) between the input appearance feature vector and the appearance feature vector corresponding to the same spatial regions. For example, the distance ('$d_a$') between the input appearance feature vector ('$a_1$') and the appearance feature vector ('$a_2$') is computed as: $d_a = \Sigma_{i=1}^{c}((a_1(i)-a_2(i))^2)$ where the notation 'c' may be a number of elements in a appearance feature vector.

At step 518, the system 100 may compare each motion distance and each appearance distance from the set of motion and appearance distances with the anomaly detection thresholds to detect the anomaly in the input video. For example, in one embodiment, the at least one anomaly detection threshold may include a motion anomaly detection threshold and an appearance anomaly detection threshold. In this embodiment, each motion distance of the set of motion distances is compared with the motion anomaly detection threshold to detect the anomaly in the input video. For instance, the system 100 may detect the anomaly in the input video, when at least one motion distance of the set of motion distances is greater than the motion anomaly detection threshold. Further, each appearance distance of the set of appearance distances is compared with the appearance anomaly detection threshold to detect the anomaly in the input video. For instance, the system 100 may detect the anomaly in the input video, when at least one appearance distance of the set of appearance distances is greater than the appearance anomaly detection threshold.

In another embodiment, when the at least one anomaly detection threshold corresponds to a single anomaly detection threshold, the system 100 may compute a weighted sum of motion and appearance distances. For instance, for each motion distance and appearance distance, the system 100 may compute the weighted sum of motion and appearance distances as: $d = dm + \lambda \cdot da$ where the notation $\lambda$ is a real-valued weight. Further, the system 100 may detect the anomaly in the input video, when at least one weighted sum of motion and appearance distances is greater than the single anomaly detection threshold.

Figure 6:
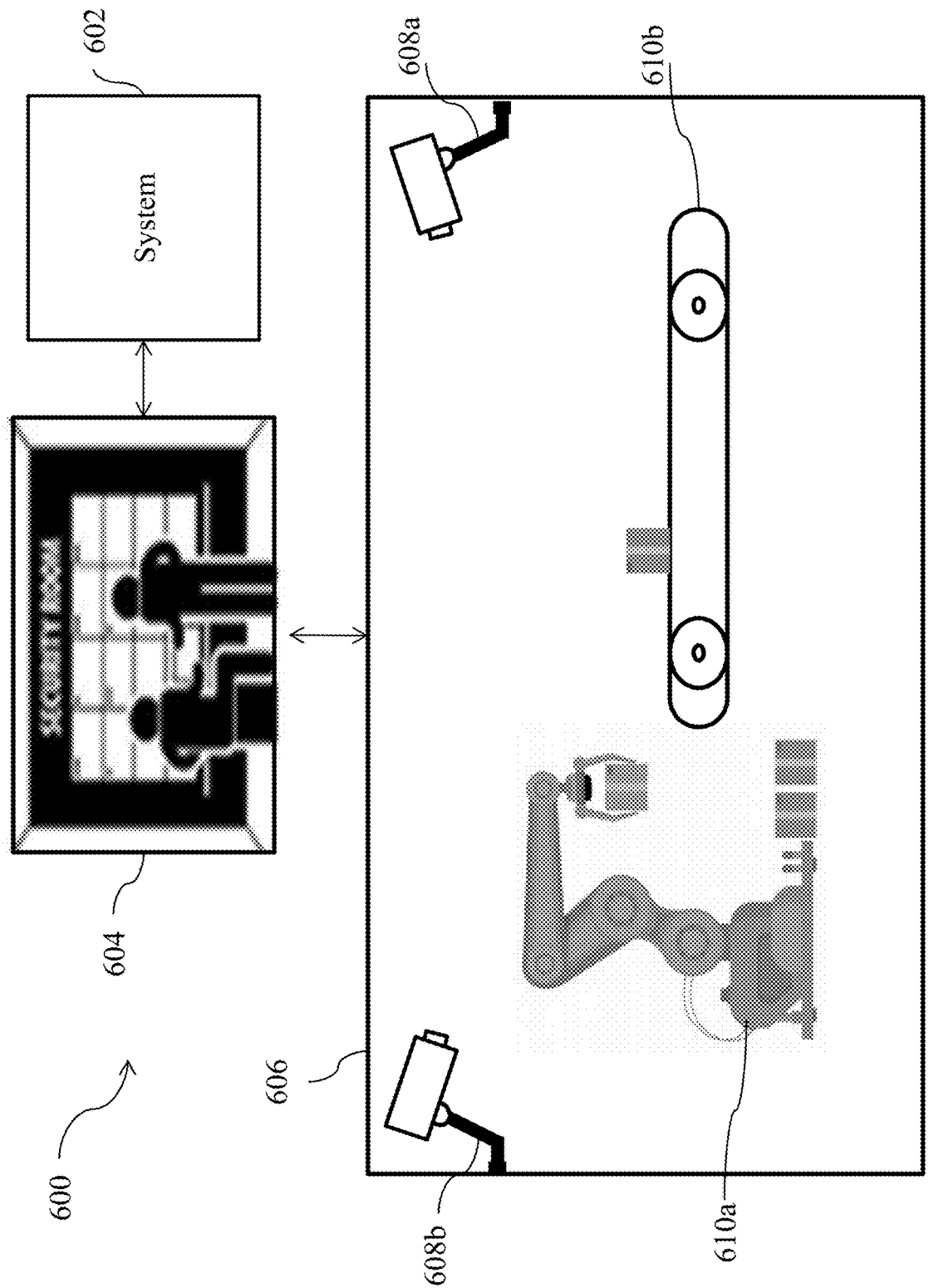
FIG. 6 illustrates a working environment of the system for detecting the anomaly in the factory automation process, according to some embodiments of the present disclosure.

FIG. 6 illustrates a working environment 600 of a system 602 for detecting the anomaly in the factory automation process, according to some embodiments of the present disclosure. FIG. 6 is explained in conjunction with FIG. 1 and FIG. 2A. The system 602 may correspond to the system 100. The working environment 600 may correspond to a surveillance system 604 of a location 606. For instance, the location 606 may be an area of a factory where the factory automation process is executed. The location 606 may be equipped with one or more imaging devices 608a and 608b. As used herein, 'imaging device' may correspond to a camera, a video player, or the like. The one or more imaging devices 608a and 608b may be positioned (or arranged) such that the one or more imaging devices 608a and 608b monitor one or more machines (such as machines 610a and 610b) performing the task. For instance, the imaging device 608a may be positioned such that the imaging device 608a monitors a robot arm 610a. For instance, the imaging device 608b may be positioned such that the imaging device 608b monitors a conveyor 610b. For example, the robot arm 610a may pick a mass from a first level and place the mass on the conveyor 610b which is at a second level different from the first level to achieve the factory automation process. Further, the conveyor 610b may move the mass from a first place to a second place different from the first place to achieve the factory automation process.

The one or more imaging devices 608a and 608b may separately capture the videos that include scenes of the factory automation process. For instance, the image device 608a may capture the video of a scene that includes the robot arm 610a picking and placing the mass. For instance, the image device 608b may capture the video of a scene that includes the conveyor 610b moving the mass. Further, the one or more imaging devices 608a and 608b may separately transmit the captured videos to the system 602. The system 602 may accept the captured video from each of the one or more imaging device 608a and 608b as the input video. Further, the system 602 may execute the flowchart 200 to detect the anomaly in each of the input video. For instance, the anomaly in the video captured by the imaging device 608a may correspond to abnormal orientation of the robot arm 610a or the like. For instance, the anomaly in the video captured by the imaging device 608b may correspond to unexpected stop of the conveyor 610b or the like. Furthermore, the system 602 may execute the control action to control the one or more machines 610a and 610b to stop the anomalous activities. Alternatively, the system 602 may generate a notification to an operator associated with the surveillance system 604 to stop the anomalous activities.

In this way, the system 602 may detect the anomaly in the factory automation scene(s) using the videos captured by the one or more imaging devices 608. Thereby, the cost of detecting the anomaly in the factory automation process may be significantly reduced in comparison to the conventional methods that uses customized sensors to monitor the one or more machines performing the task and detects the anomaly.

In another implementation, the location 606 may be equipped with a single imaging device 608. In this implementation, the single imaging device 608 may be positioned such that the single imaging device 608 monitors the task performed by each of the one or more machines 610a and 610b. Thereby, the single imaging device 608 may capture a video including multiple interdependent processes of the factory automation scene. For instance, the multiple interdependent processes may be the robot arm 610a picking and placing the mass and the conveyor moving the mass. Further, the single imaging device 608 may transmit the captured video to the system 602. The system 602 may accept the captured video as the input video. Further, the system 602 may execute the flowchart 200 to detect the anomaly in the input video. Accordingly, in this implementation, the system 602 detects the anomaly in multiple interdependent processes from a single video without the expense of programming the logic of anomaly detection.

Figure 7:
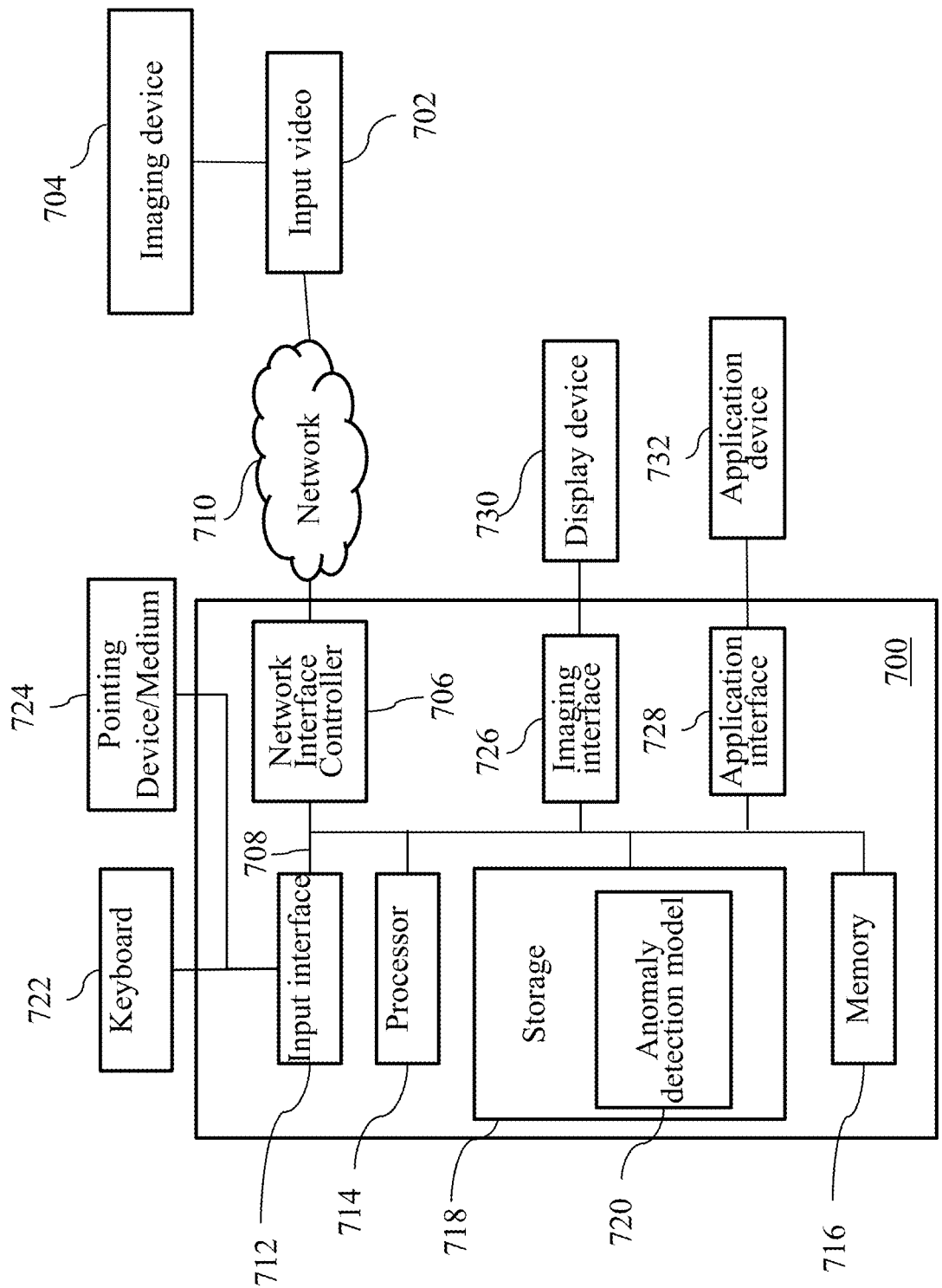
FIG. 7 illustrates an overall block diagram of the system for detecting the anomaly in the video of the factory automation scene, according to some embodiments of the present disclosure.

FIG. 7 illustrates an overall block diagram of a system 700 for detecting the anomaly in a video 702 of the factory automation scene, according to some embodiments of the present disclosure. FIG. 7 is explained in conjunction with FIG. 1 and FIG. 2A. The system 700 may correspond to the system 100. The system 700 may have a number of interfaces connecting the system 700 with one or more imaging devices 704. For example, a network interface controller (NIC) 706 is adapted to connect the system 700, through a bus 708, to a network 710. Through the network 710, either wirelessly or through wires, the system 700 may accept the input video 702 of the factory automation scene. Additionally, additional information associated with the input video 702 may be received via an input interface 712. For instance, the additional information associated with the input video 702 may correspond to the number of the predetermined patterns. The input interface 712 may connect the system 700 to a keyboard 722 and/or a pointing device 724. For instance, the pointing device 724 may include a mouse, trackball, touchpad, joy stick, pointing stick, stylus, or touchscreen, among others.

The system 700 includes a processor 714 configured to execute stored instructions, as well as a memory 716 that stores instructions that are executable by the processor 714. The processor 714 may be a single core processor, a multi-core processor, a computing cluster, or any number of other configurations. The memory 716 may include random access memory (RAM), read only memory (ROM), flash memory, or any other suitable memory systems. Further, the system 700 includes a storage device 718 adapted to store different modules storing executable instructions for the processor 714. The storage device 718 may be implemented using a hard drive, an optical drive, a thumb drive, an array of drives, or any combinations thereof.

The storage device 718 is configured to store an anomaly detection model 720. Additionally, the storage device 718 may store the set of training feature vectors. For instance, the set of training feature vectors may correspond to the set of training feature vectors 204. In some embodiments, the processor 714 may be configured to execute the anomaly detection model 720 to perform the steps of the flowchart 200 described in detailed description of FIG. 2A—FIG. 2D. For instance, the system 700 may accept the input video 702 of the factory automation scene. Further, the system 700 may accept the set of training feature vectors derived from the spatio-temporal regions of the training video. The training video may include the set of video frames of the normal operation of the machine performing the task. Each spatio-temporal region is associated with the one or multiple training feature vectors, where each training feature vector includes the motion feature vector defining the temporal variation of counts of the predetermined patterns.

Furthermore, the system 700 may partition the input video 702 into the multiple sequences of video volumes corresponding to spatial and temporal dimensions of the spatio-temporal regions of the training video, such that the video volume includes the sequence of image patches defined by the spatial dimension and the temporal dimension of the corresponding spatio-temporal region. Furthermore, the system 700 may determine the binary difference image for each consecutive pair of image patches in the sequence of image patches of each of the video volumes to produce the sequence of binary difference images for each of the video volumes.

Furthermore, the system 700 may count the occurrences of each of the predetermined patterns of the pixels in each binary difference image for each of the video volumes to produce the input feature vector including the input motion feature vector defining the temporal variation of counts of the predetermined patterns for each of the video volumes. Furthermore, the system 700 may compute the minimum distance between the input feature vector of each of the video volumes and the training feature vectors associated with corresponding spatial regions in the scene to produce the set of distances. Furthermore, the system 700 may compare each distance from the set of distances with the anomaly detection threshold to detect the anomaly in the input video of the factory automation scene.

Additionally, the system 700 may include an imaging interface 726 and application interface 728. The imaging interface 726 connects the system 700 to a display device 730. For instance, the display device 730 includes a computer monitor, television, projector, or mobile device, among other things. The application interface 728 connects the system 700 to an application device 732. For instance, the application device 732 may include the surveillance system or the like. In an example embodiment, the system 700 output the results of the video anomaly detection, via the imaging interface 726 and/or the application interface 728.

The above description provides exemplary embodiments only, and is not intended to limit the scope, applicability, or configuration of the disclosure. Rather, the above description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the above description to provide a thorough understanding of the embodiments. However, understood by one of ordinary skill in the art may be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination may correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Although the present disclosure has been described with reference to certain preferred embodiments, it is to be understood that various other adaptations and modifications may be made within the spirit and scope of the present disclosure. Therefore, it is the aspect of the appended claims to cover all such variations and modifications as come within the true spirit and scope of the present disclosure.

The invention claimed is:

1. A system for detecting an anomaly in a video of a factory automation scene, the system comprising: a processor; and a memory having instructions stored thereon that, when executed by the processor, cause the system to:
   accept an input video of a scene including a machine performing a task;
   accept a set of training feature vectors derived from spatio-temporal regions of a training video of a normal operation of the machine performing the task, wherein a spatio-temporal region is associated with one or multiple training feature vectors, each training feature vector includes a motion feature vector defining a temporal variation of counts of predetermined patterns;
   partition the input video into multiple sequences of video volumes corresponding to spatial and temporal dimensions of the spatio-temporal regions of the training video, such that a video volume includes a sequence of image patches defined by a spatial dimension and a temporal dimension of the corresponding spatio-temporal region;
   determine a binary difference image for each consecutive pair of image patches in the sequence of image patches of each of the video volumes to produce a sequence of binary difference images for each of the video volumes;
   count occurrences of each of the predetermined patterns of pixels in each binary difference image for each of the video volumes to produce an input feature vector including an input motion feature vector defining a temporal variation of counts of the predetermined patterns for each of the video volumes, wherein each pattern is a specific number of on (1) or off (0) pixels in a window of a size smaller than the size of the binary difference image;
   compute a minimum distance between the input feature vector of each of the video volumes and the training feature vectors associated with corresponding spatial regions in the scene to produce a set of distances; and
   compare each distance from the set of distances with an anomaly detection threshold to detect anomalies in the input video of the scene.

2. The system of claim 1, wherein the processor is configured to:
   detect the anomaly in the input video of the scene when at least one distance in the set of distances is greater than the anomaly detection threshold; and
   execute a control action in response to detecting the anomaly.

3. The system of claim 1, wherein the training feature vectors for the spatio-temporal region are selected such that the minimum distance among them is a function of the anomaly detection threshold.

4. The system of claim 1, wherein the training feature vectors for the spatio-temporal region are selected such that the minimum distance among them is equal to or greater than the anomaly detection threshold.

5. The system of claim 1, wherein the training feature vectors for the spatio-temporal region are selected such that the minimum distance among them is greater than a median distance between all possible pairs of training feature vectors for that spatial region.

6. The system of claim 1, wherein to determine the training feature vectors, the processor is configured to:
   partition the training video into the spatio-temporal regions of the training video to produce corresponding sequences of training patches;
   determine binary difference image for each pair of patches in each of the sequences of training patches;
   count occurrences of each of the predetermined patterns of pixels in each binary difference image for each of the spatio-temporal regions to produce one or multiple training feature vectors for each of the spatio-temporal regions, wherein each training feature vector include the motion feature vector defining the temporal variation of counts of the predetermined patterns;
   compute a distance between each training feature vector corresponding to the same spatial region in the scene to produce a set of distances between training feature vectors; and
   select a training feature vector in the set of training feature vectors when all distances between the selected training feature vector and corresponding feature vectors in the set of training feature vectors are above a distance threshold defining a minimum distance among the training feature vectors stored in the memory and corresponding to the same spatial region.

7. The system of claim 6, wherein to determine the distance threshold, the processor is further configured to:
   calculate a mean of distances between all training feature vectors and the training feature vectors in the set of feature vectors; and
   increase the mean by a standard deviation to produce the distance threshold.

8. The system of claim 1, wherein to determine the binary difference image, the processor is configured to
   determine pixel difference values between subsequent image patches of the video volume to produce a difference image;
   threshold pixel values of the difference image to produce the binary difference image.

9. The system of claim 1, wherein the temporal dimension of the spatio-temporal regions define a portion of the normal operation of the machine performing the task or the entire normal operation of the machine performing the task.

10. The system of claim 1, wherein the processor is configured to accept the predetermined patterns selected for the performed task.

11. The system of claim 1, wherein the processor is configured to select the predetermined patterns from a library of patterns.

12. The system of claim 1, wherein the size of the window is three pixels wide and three pixels long covering nine pixels, such that the predetermined patterns include ten patterns.

13. The system of claim 1, wherein the window defines all 3-pixel by 3-pixel neighborhoods occurring in the binary difference image.

14. The system of claim 1, wherein the processor is further configured to formulate a histogram, based on the count of occurrences of each of the predetermined patterns in the binary difference images, wherein the histogram are the counts of the number of above threshold pixels in every 3-pixel by 3-pixel neighborhood occurring in the binary difference image.

15. The system of claim 1, wherein each of the training feature vectors and each of the input feature vectors include a corresponding appearance feature vector derived from a content of a video patch.

16. The system of claim 15, wherein the appearance feature vector is a histogram of oriented gradients computed for an image patch of the video patch.

17. The system of claim 15, wherein the appearance feature vector is a binary difference image computed for two consecutive image patches of the video patch.

18. A method for detecting an anomaly in a video of a factory automation scene, the method comprising:
    accepting an input video of a scene including a machine performing a task;
    accepting a set of training feature vectors derived from spatio-temporal regions of a training video of a normal operation of the machine performing the task, wherein a spatio-temporal region is associated with one or multiple training feature vectors, each training feature vector includes a motion feature vector defining a temporal variation of counts of predetermined patterns;
    partitioning the input video into multiple sequences of video volumes corresponding to spatial and temporal dimensions of the spatio-temporal regions of the training video, such that a video volume includes a sequence of image patches defined by a spatial dimension and a temporal dimension of the corresponding spatio-temporal region;
    determining a binary difference image for each consecutive pair of image patches in the sequence of image patches of each of the video volumes to produce a sequence of binary difference images for each of the video volumes;
    counting occurrences of each of the predetermined patterns of pixels in each binary difference image for each of the video volumes to produce an input feature vector including an input motion feature vector defining a temporal variation of counts of the predetermined patterns for each of the video volumes, wherein each pattern is a specific number of on (1) or off (0) pixels in a window of a size smaller than the size of the binary difference image;
    computing a minimum distance between the input feature vector of each of the video volumes and the training feature vectors associated with corresponding spatial regions in the scene to produce a set of distances; and
    comparing each distance from the set of distances with an anomaly detection threshold to detect anomalies in the input video of the scene.

19. A system for detecting an anomaly in a video of a factory automation scene, the system comprising: a processor; and a memory having instructions stored thereon that, when executed by the processor, cause the system to:
    accept an input video of a scene including a machine performing a task;
    accept a set of training feature vectors derived from spatio-temporal regions of a training video of a normal operation of the machine performing the task, wherein a spatio-temporal region is associated with one or multiple training feature vectors, each training feature vector consists of an appearance feature vector and a motion feature vector;
    partition the input video into multiple sequences of video volumes corresponding to spatial and temporal dimensions of the spatio-temporal regions of the training video, such that a video volume includes a sequence of image patches defined by a spatial dimension and a temporal dimension of the corresponding spatio-temporal region;
    determine a binary difference image for each consecutive pair of image patches in the sequence of image patches of each of the video volumes to produce a sequence of binary difference images for each of the video volumes;
    count occurrences of each of the predetermined patterns of pixels in each binary difference image for each of the video volumes to produce an input motion feature vector defining a temporal variation of counts of the predetermined patterns for each of the video volumes, wherein each pattern is a specific number of on (1) or off (0) pixels in a window of a size smaller than the size of the binary difference image;
    compute an input appearance feature vector for each of the video volumes, wherein the input appearance feature vector represents the pattern of pixels occurring in a video volume;
    compute a minimum distance between the input motion feature vector of each of the video volumes and the motion feature vector of the training feature vectors associated with corresponding spatial regions in the scene to produce a set of motion distances;
    compute a minimum distance between the input appearance feature vector of each of the video volumes and the appearance feature vector of the training feature vectors associated with corresponding spatial regions in the scene to produce a set of appearance distances; and
    compare each motion and appearance distance from the set of motion and appearance distances with at least one anomaly detection threshold to detect anomalies in the input video of the scene.

20. A system for detecting an anomaly in a video of a factory automation scene, the system comprising: a processor; and a memory having instructions stored thereon that, when executed by the processor, cause the system to:
    accept an input video of a scene including a machine performing a task;
    accept a set of training feature vectors derived from spatio-temporal regions of a training video of a normal operation of the machine performing the task, wherein a spatio-temporal region is associated with one or multiple training feature vectors, each training feature vector includes a motion feature vector defining a temporal variation of counts of predetermined patterns;
    partition the input video into multiple sequences of video volumes corresponding to spatial and temporal dimensions of the spatio-temporal regions of the training video, such that a video volume includes a sequence of image patches defined by a spatial dimension and a temporal dimension of the corresponding spatio-temporal region;

determine a binary difference image for each consecutive pair of image patches in the sequence of image patches of each of the video volumes to produce a sequence of binary difference images for each of the video volumes;

count occurrences of each of the predetermined patterns of pixels in each binary difference image for each of the video volumes to produce an input feature vector including an input motion feature vector defining a temporal variation of counts of the predetermined patterns for each of the video volumes;

compute a minimum distance between the input feature vector of each of the video volumes and the training feature vectors associated with corresponding spatial regions in the scene to produce a set of distances; and compare each distance from the set of distances with an anomaly detection threshold to detect anomalies in the input video of the scene, wherein to determine the training feature vectors, the processor is configured to:

partition the training video into the spatio-temporal regions of the training video to produce corresponding sequences of training patches;

determine binary difference image for each pair of patches in each of the sequences of training patches;

count occurrences of each of the predetermined patterns of pixels in each binary difference image for each of the spatio-temporal regions to produce one or multiple training feature vectors for each of the spatio-temporal regions, wherein each training feature vector includes the motion feature vector defining the temporal variation of counts of the predetermined patterns;

compute a distance between each training feature vector corresponding to the same spatial region in the scene to produce a set of distances between training feature vectors; and select a training feature vector in the set of training feature vectors when all distances between the selected training feature vector and corresponding feature vectors in the set of training feature vectors are above a distance threshold defining a minimum distance among the training feature vectors stored in the memory and corresponding to the same spatial region.

* * * * *